(12) United States Patent
Wright (10) Patent No.: US 8,714,278 B2
(45) Date of Patent: May 6, 2014

(54) SOIL TREATMENT APPARATUS, A SOIL TREATMENT COMPONENT AND A METHOD OF ASSEMBLING A SOIL TREATMENT APPARATUS

(75) Inventor: Philip Wright, Sleaford (GB)

(73) Assignee: Simba International Limited (GB)

( * ) Notice: Subject to any disclaimer, the term of this patent is extended or adjusted under 35 U.S.C. 154(b) by 757 days.

(21) Appl. No.: 11/993,638

(22) PCT Filed: Jul. 1, 2005

(86) PCT No.: PCT/GB2005/002602
§ 371 (c)(1),
(2), (4) Date: Feb. 23, 2010

(87) PCT Pub. No.: WO2007/003865
PCT Pub. Date: Jan. 11, 2007

(65) Prior Publication Data
US 2010/0139937 A1    Jun. 10, 2010

(51) Int. Cl.
A01B 29/04 (2006.01)
(52) U.S. Cl.
USPC ............................ 172/519; 172/537; 172/554
(58) Field of Classification Search
USPC ......... 172/537, 554, 519, 542, 149, 150, 170; 404/121, 124, 123, 131, 132; 152/210, 152/208
See application file for complete search history.

(56) References Cited

U.S. PATENT DOCUMENTS

| | | | | |
|---|---|---|---|---|
| 895,230 A | * | 8/1908 | Beier | 172/554 |
| 948,389 A | * | 2/1910 | Cairns | 152/300 |
| 973,999 A | | 10/1910 | Titus | |
| 1,304,871 A | * | 5/1919 | Garst | 172/548 |
| 1,551,399 A | | 8/1925 | Jones | |
| 1,718,823 A | | 6/1929 | Jeppson | |
| 2,739,517 A | * | 3/1956 | Roberts | 172/68 |
| 2,904,093 A | | 9/1959 | Kroon | |
| 2,983,204 A | * | 5/1961 | Odd | 404/132 |
| 2,987,975 A | * | 6/1961 | Seaman | 404/132 |
| 3,207,234 A | * | 9/1965 | Stewart | 172/519 |
| 3,260,294 A | | 7/1966 | Campion | |
| 3,945,748 A | * | 3/1976 | Berrange | 404/117 |
| 4,020,906 A | * | 5/1977 | Wells | 172/350 |
| 4,489,790 A | * | 12/1984 | Lattin | 172/519 |
| 4,932,477 A | * | 6/1990 | Atwood | 172/519 |
| 5,004,030 A | | 4/1991 | McLaughlin | |
| 5,413,055 A | * | 5/1995 | Dern | 111/130 |
| 5,628,372 A | * | 5/1997 | Creyke | 172/534 |
| 7,478,684 B2 | * | 1/2009 | Ward | 172/537 |
| 2003/0000713 A1 | * | 1/2003 | Mathiowetz | 172/170 |

FOREIGN PATENT DOCUMENTS

| | | |
|---|---|---|
| DE | 1680451 A1 | 4/1971 |
| EP | 0484602 A | 5/1992 |
| FR | 813667 A | 6/1937 |
| GB | 316739 A | 8/1929 |

(Continued)

OTHER PUBLICATIONS

International Preliminary Report on Patentability issued Jan. 9, 2008 in International Application No. PCT/GB2005/002602.

(Continued)

*Primary Examiner* — Matthew D Troutman
(74) *Attorney, Agent, or Firm* — Barnes & Thornburg LLP (57) ABSTRACT

A soil treatment apparatus (10) comprises an endless band (12) of resilient material with soil treatment teeth (14) projecting radially therefrom. The teeth are replacably attached to the band (12).

17 Claims, 12 Drawing Sheets

(56) References Cited

FOREIGN PATENT DOCUMENTS

| GB | 2280650 | A  | 2/1995  |
| LU | 42649   | A1 | 1/1963  |
| RU | 94037369| A1 | 11/1996 |
| RU | 2122302 | C1 | 11/1998 |
| SU | 1396976 | A1 | 5/1988  |
| SU | 1653561 | A1 | 6/1991  |

OTHER PUBLICATIONS

International Search Report and Written Opinion for PCT/GB2005/002602 dated Apr. 4, 2006.

* cited by examiner

SOIL TREATMENT APPARATUS, A SOIL TREATMENT COMPONENT AND A METHOD OF ASSEMBLING A SOIL TREATMENT APPARATUS

This application is the U.S. national stage of PCT/GB2005/002602 filed Jul. 1, 2005. The disclosure of PCT/GB2005/002602 is hereby incorporated herein by reference.

BRIEF SUMMARY OF THE INVENTION

The present invention relates to a soil treatment apparatus, particularly although not exclusively limited to, apparatus for reservoir tillage of soil.

Various soil treatment apparatus are known. Typical soil treatment apparatus include ploughs, discs, harrows, press cultivators etc. More specifically, a cultivator may be equipped with a variety of different soil treatment apparatus including tines, levelling boards, press rings. One form of press ring is shown in British patent number 2323511 in which dish or plate-like members are clamped together compressively to provide a self-sharpening press ring. Another soil treatment apparatus is shown in European patent number 0622985 which discloses a wheel with a deeply notched tread. When the wheel passes over a ploughed or loose, cultivated soil surface, the surface is consolidated and left with a dimpled soiled profile which increases retention of water in the surface and prevents top soil run off.

One of the problems associated with the wheel shown in EP0622985 is the difficulty in obtaining a material which is sufficiently resilient in order to be self-cleaning whilst tough enough to withstand the rigours of usage in different soil types including stony ground. Self-cleaning is the ability of the wheel to avoid soil build up on its surface, particularly between adjacent teeth of the tread. If soil build up occurs then the wheel cannot produce the desired soil profile as the soil stuck to the wheel surface leaves its own imprint.

It is an object of the invention to provide an improved soil treatment apparatus.

According to a first aspect of the invention there is provided a soil treatment apparatus comprising an endless band of resilient material and a soil treatment component replaceably attached to the endless band so as to project radially therefrom.

In that way, the band of resilient material can be designed for self-cleaning whilst the soil treatment component, which is the part which is most prone to wear can be designed accordingly also. The band must be sufficiently resilient to flex so as to self-clean.

In a first embodiment, the endless band may include an aperture defined radially therethrough and the soil treatment component may extend through the aperture.

The endless band preferably has a radial wall part and opposite side wall parts.

A plurality of radial apertures may be formed through the band. A respective plurality of soil treatment components may be provided.

The soil treatment component may have a mounting part and a soil treatment part.

The soil treatment component may be formed in two separate parts, the first part is the soil treatment part and is arranged radially outbound of the endless band and the second part is the mounting part and is arranged radially inbound of the endless band. In such a case, the endless band may include a recess in its outer peripheral surface to receive the first part with an interference fit. A spacer band may be provided arranged radially inwardly of the second part or parts to assist in preventing soil ingress. More than one spacer band may be provided, preferably two for each endless band.

The apparatus may be carried on a cylindrical core to form a roller. Preferably the outer diameter of the core is smaller than the inner diameter of the apparatus. The cylindrical core may be elongate and a plurality of soil treatment apparatus may be carried thereon.

Preferably five or more soil treatment components are provided and a respective number of apertures are formed through the endless band. Most preferably eight soil treatment components are provided.

The soil treatment component may be relatively hard and the endless band relatively pliable compared to each other. The wall thickness of the endless band may be less than the wall thickness of the soil treatment component. The mounting part preferably acts as a stop to limit radial deflection of the radial wall of the endless band. Where a spacer band is provided, the dimensions of the spacer band and/or the mounting parts may be selected to determine the amount of deflection of the radial wall allowed.

The soil treatment portion may be pyramidal, frustopyramidal, conical or frustoconical.

The soil treatment component may be formed from rubber or other suitable elastomeric material, preferably recycled rubber, most preferably rubber from recycled vehicle tyres or, where appropriate a harder material may be used.

According to a second aspect of the invention, there is provided a soil treatment component having a body of moulded material and one or both of a load spreading member and a fastener, moulded therewithin.

Both a load spreading member, such as a plate, and a fastener, such as a nut, may be provided. The fastener may be fixed to the plate, for example by welding.

According to a third aspect of the invention, there is provided a soil treatment component formed from rubber from recycled vehicle tyres.

The soil treatment apparatus preferably includes one or more soil treatment components having one or more of the features described above.

According to a fourth aspect of the invention, there is provided a method of making a soil treatment apparatus comprising the steps of providing a vehicle tyre, removing the tread of the tyre and forming apertures through the radial wall of the tyre.

The method preferably further comprises attaching soil treatment components to the apparatus by means of the apertures in the radial wall.

The step of removing the tread may comprise grinding or cutting the tread away from the tyre. In that case, the tread material ground or cut away may be used to mould the aforesaid soil treatment components.

Soil treatment apparatus and a soil treatment component in accordance with the invention will now be described by way of example and with reference to the accompanying drawings, in which:

DETAILED DESCRIPTION OF THE INVENTION

Figure 1:
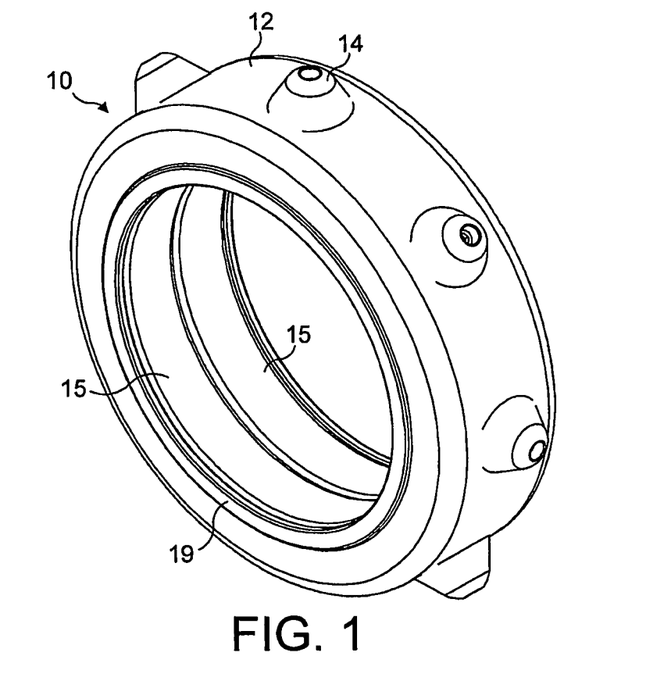
FIG. 1 is a perspective view of a soil treatment apparatus in accordance with the invention.

In FIG. 1, a soil treatment apparatus 10 comprises an endless band 12 of resilient material with eight soil treatment components or teeth 14 projecting radially therefrom. Two spacer bands 15 are arranged inside the endless band 12.

Figures 4, 5:
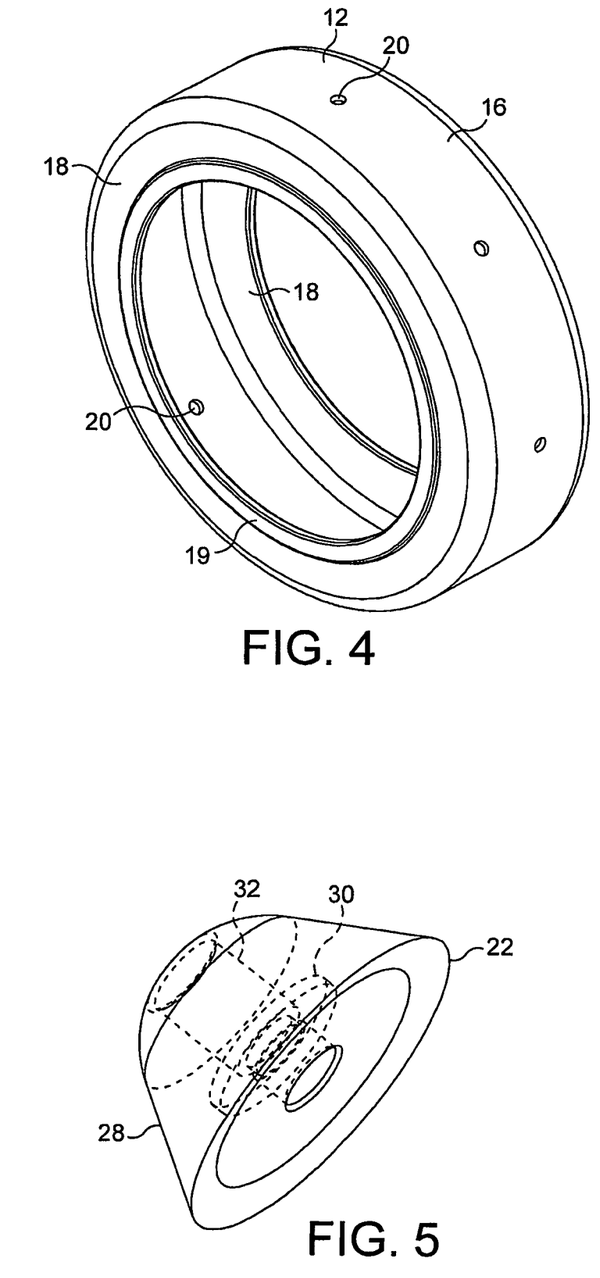
FIG. 4 is a perspective view of the endless band of the soil treatment apparatus of FIGS. 1 to 3.
FIG. 5 is a perspective view of a soil treatment part of a soil treatment tooth in accordance with the second aspect of the invention.

The endless band 12 is shown in more detail in FIG. 4. The band 12 comprises a radial wall part 16 and side wall parts 18 which extend radially inwardly of the band from the opposite edges of the radial wall part 16. The radial wall part 16 has eight small circular apertures 20 formed therethrough, the apertures being regularly spaced about the radial wall part 16. The side wall parts 18 define an internal diameter bounded by an annular thickened bead 19.

The soil treatment component or tooth 14 is shown in more detail in FIGS. 5-10. Each tooth 14 comprises a soil treatment piece 22 and a mounting piece 24. The soil treatment piece 22 is arranged on the outside of the endless band 12 and the mounting piece 24 is arranged on the inside of the endless band 12. The soil treatment piece 22 is connected to a respective mounting piece 24 by a fastener arrangement 26 which passes through the wall of the endless band 12.

Figure 6:
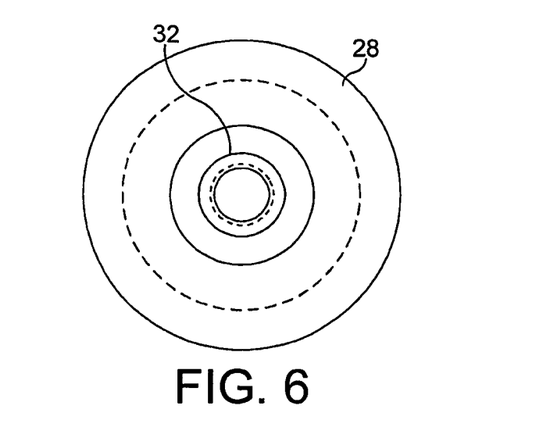
FIG. 6 is a plan view of the soil treatment part of FIG. 5.
Figure 7:
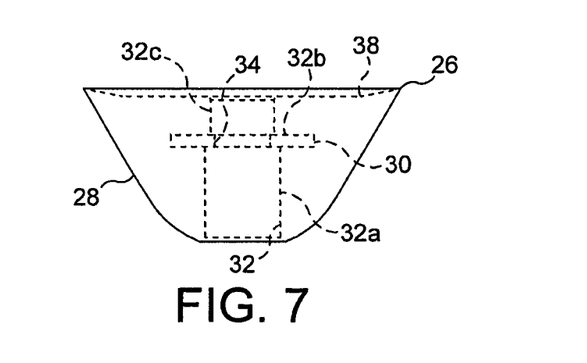
FIG. 7 is an elevation of the soil treatment part of FIGS. 5 and 6.

The soil treatment piece 22 is shown in more detail in FIGS. 5 to 7 and comprises a frusto-conical body 28 with a load spreading plate 30 in-moulded therein. A bore 32 is formed therethrough. The bore 32 has a first diameter part 32a which steps down via shoulder 32b to a smaller diameter part 32c. The in-moulded load spreading plate 30 is moulded in the body 28 so that it abuts the shoulder 32b of the bore 32. The load spreading plate 30 includes a central aperture 34 of slightly smaller diameter to the smaller diameter part 32c of the bore 32.

The lower, peripheral edge 36 of the body 28 stands proud of the remainder of the base 38 of the body 28. In other words, the base 38 is concave.

Figure 8:
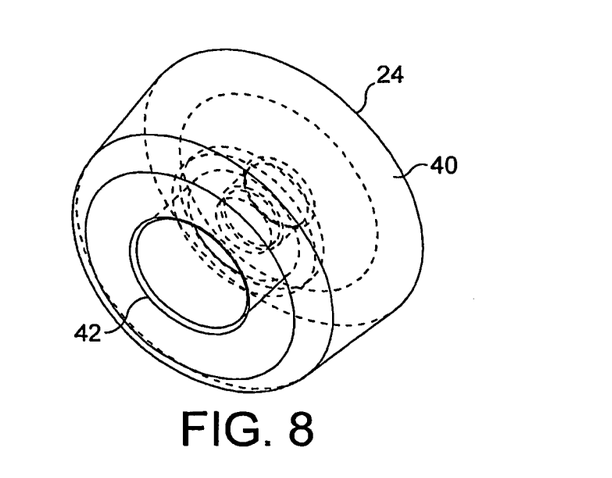
FIG. 8 is a perspective view of a mounting part of a soil treatment tooth.
Figure 9:
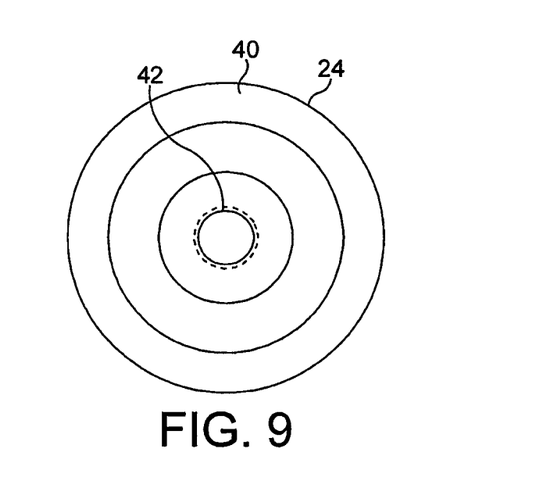
FIG. 9 is a plan view of the mounting part of FIG. 8.
Figure 10:
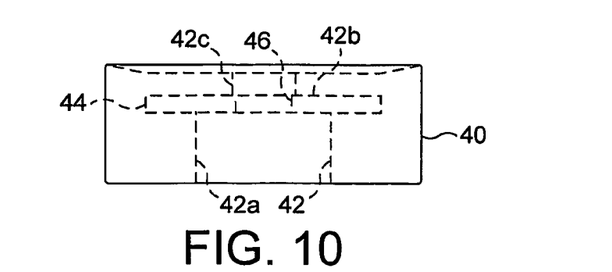
FIG. 10 is an elevation of the mounting part of FIGS. 8 & 9.

The mounting piece 24 is shown in more detail in FIGS. 8 to 10. The mounting piece 24 comprises a moulded cylindrical rubber body 40. A bore 42 is formed axially therethrough. The bore 42 comprises a first bore part 42a having a first diameter which steps down via shoulder 42b to smaller diameter part 42c. A load spreading plate 44 is in-moulded in the body 40 in such a way as to abut the shoulder 42b. The load spreading plate 44 has an aperture 46 formed therein which is coaxial with and slightly smaller than the small diameter part 42c of the bore 42.

Figure 3:
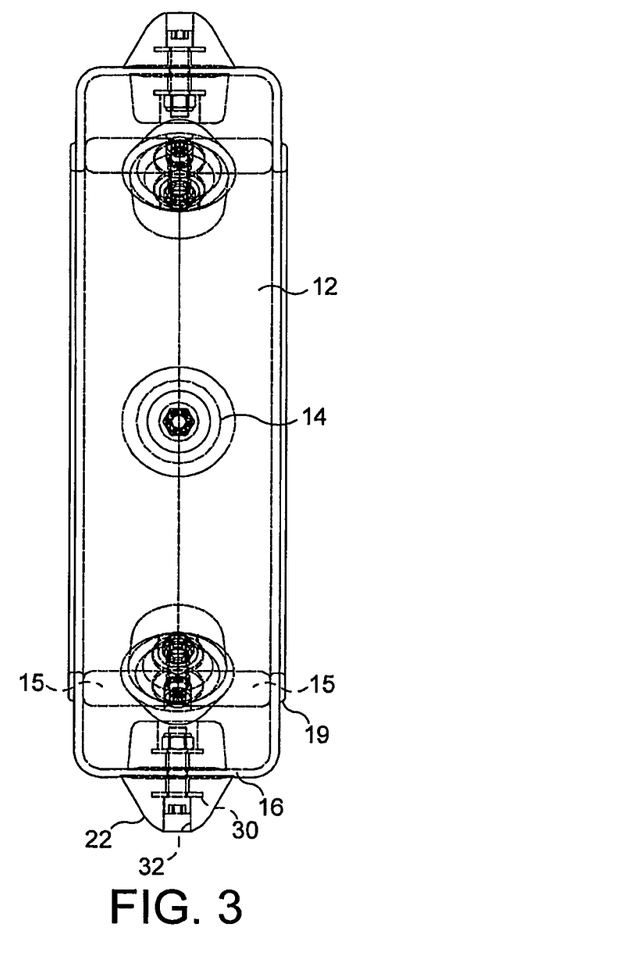
FIG. 3 is a radial elevation of the apparatus of FIGS. 1 and 2.

As can be seen clearly in FIG. 3, the wall thickness of the soil treatment piece 22 and the mounting piece 24 are greater than that of the radial wall part 16 of the band 12. That provides the aforementioned advantage that the soil treatment part has better wear characteristics while the radial wall part 16 is sufficiently flexible to self clean.

Figure 11:
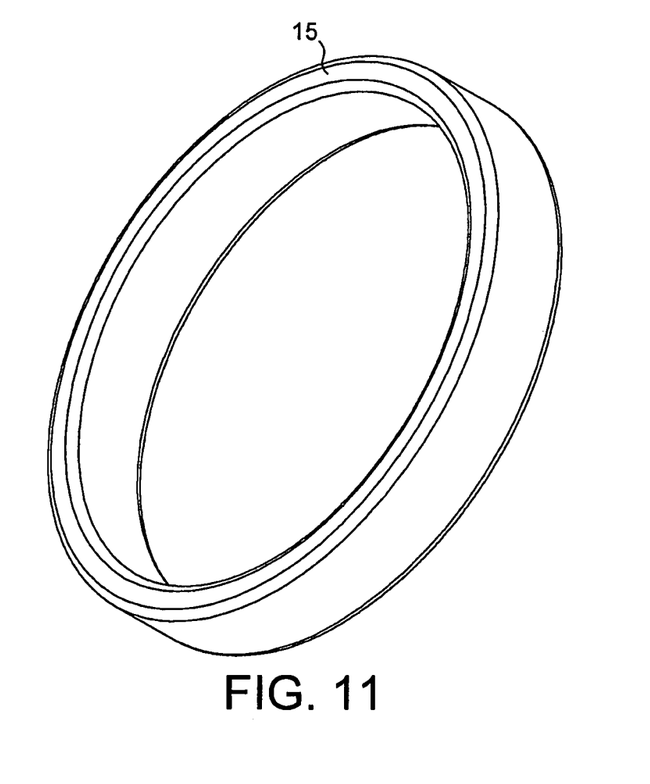
FIG. 11 is a perspective view of a spacer band.
Figure 12:
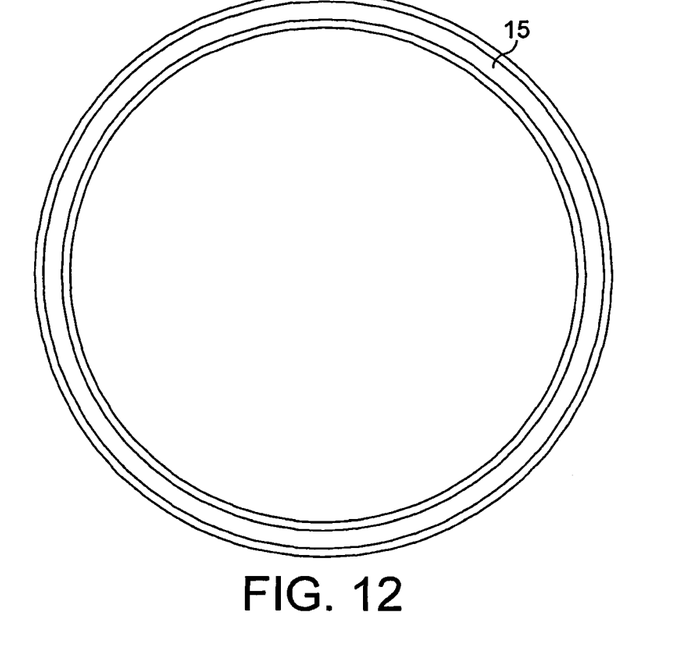
FIG. 12 is an axial elevation of the spacer band of FIG. 11, FIG. 13, is a radial elevation of the spacer band of FIGS. 11 & 12.
Figure 13:
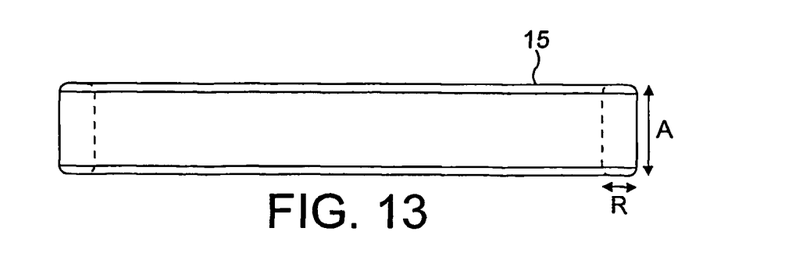

In FIGS. 11 to 13 the spacer band 15 is shown. The spacer band 15 is a circular band of material, such as elastomeric material, particularly rubber such as rubber from vehicle tyres.

Figure 2:
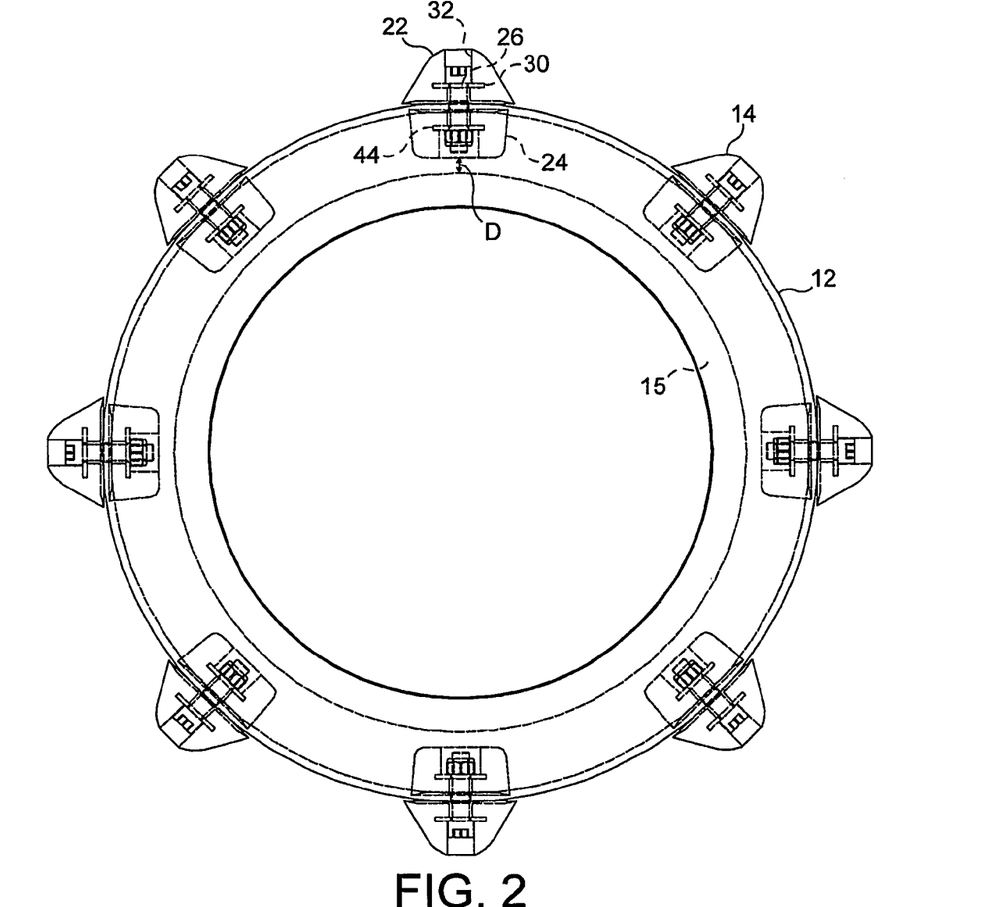
FIG. 2 is an axial elevation of the apparatus of FIG. 1.

The spacer band 15 has a radial depth R and an axial depth A (see FIG. 13). As can best be seen in FIGS. 1, 2 and 3, the internal diameter of the spacer band 15 is the same as the internal diameter defined by the side walls 18 of the endless band 12.

The axial depth A of the spacer band is chosen so that two of the spacer bands 15 can fit between the side walls 18 of the endless band 12 so that the side walls 18 are slightly pushed apart.

Figure 14:
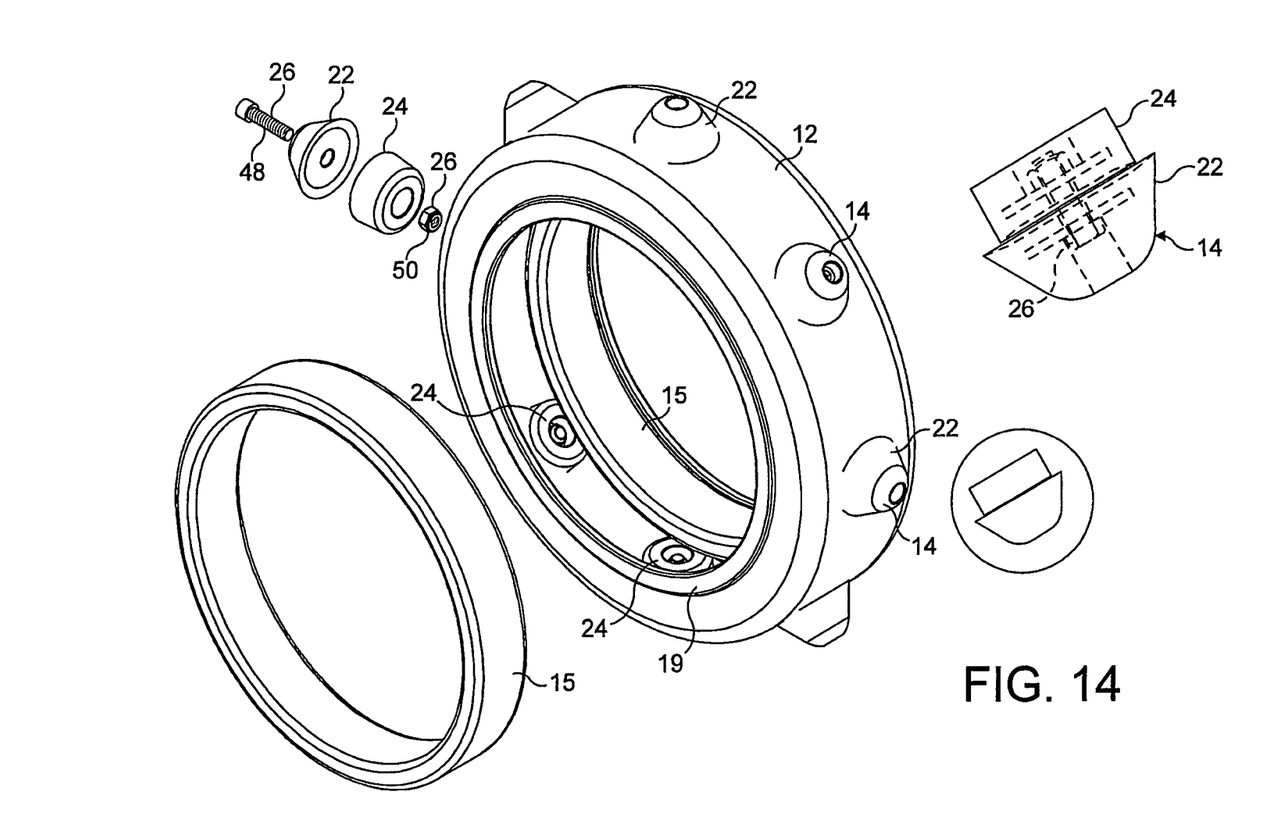
FIG. 14 is an exploded perspective view of the soil treatment apparatus of FIGS. 1 to 13.

FIG. 14 illustrates the assembly of the apparatus 10. The soil treatment teeth 14 are installed onto the band 12 by inserting the mounting piece 24 onto the inside of the band 12 between the side walls 18 so as to be coaxial with a respective aperture 20 in the radial wall 16. The soil treatment piece 22 is arranged on the outside of the radial wall 16 coaxial with the aperture 20. A bolt 48 is received through the bore 32, through the aperture 20 and into the bore 42 where it is received by a nut 50 in the bore 42. The process is repeated for the remaining soil treatment teeth 14. Then the spacer bands 15 are inserted into the endless band 12. The soil treatment pieces 22 may be connected to the soil mounting parts by other appropriate fastening means. For example, they may be riveted together or welded or adhered together. The term "replaceably attached" means that they can be replaced once worn down and replacement may entail cutting the pieces 22, 24 apart for removal. In one embodiment, the mounting piece 24 can be dispensed with altogether and the soil treatment piece 22 can be attached to the band 12 by means of a nut, bolt and washer. In another embodiment, the soil treatment piece may include a snap-fit formation which can be pushed through the aperture to secure the soil treatment piece on the band 12. In a further embodiment, one of the soil treatment piece 22 and mounting piece 24 may include an integral projection which extends through the aperture and is received in a recess or the other piece, either by snap-fitting or by welding or adhesive bonding.

Figure 15:
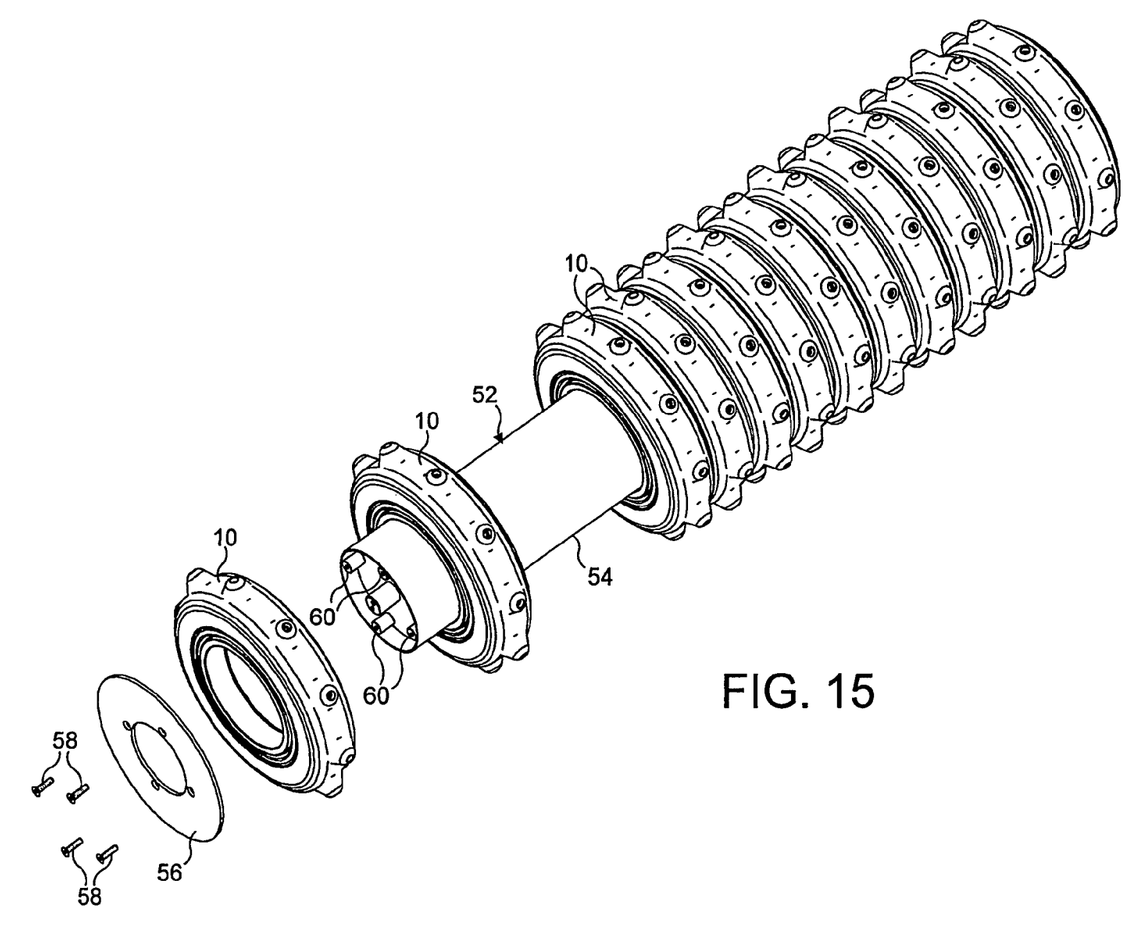
FIG. 15 is a perspective view of a series of soil treatment apparatus arranged on a cylindrical core.

Once the soil treatment apparatus 10 of FIG. 14 is assembled, it can then be arranged on a roller 52 as shown in FIG. 15. The roller 52 comprises a cylindrical core 54 with end plates (one shown) 56.

The outer diameter of the cylindrical core 54 is slightly smaller than the inner diameter of the soil treatment apparatus 10 so that the soil treatment apparatus is an easy sliding fit on the roller 52. The soil treatment apparatus 10 is retained effectively rigidly on the roller by virtue of the axial compression applied by the end plates 56 and allows adjacent apparatus to roll independently.

The apparatuses 10 are secured on the cylindrical core 54 by means of an end plate 56 which is fastened by means of bolts 58 which extend into appropriately screw-threaded integral nuts 60 in the end of the core 54. The apparatuses 10 are arranged on the core 54 in such a way that they are compressed axially. This increases the "rigidity" of the apparatus on the roller and reduces the possibility of soil ingress between individual apparatuses 10 on the roller. The end plates 56 compress the side walls 18 of the apparatuses 10 so that the spacer bands 15 are held in compression and the beads 19 of adjacent bands 12 compress together to create a seal against soil ingress in use.

Figure 16:
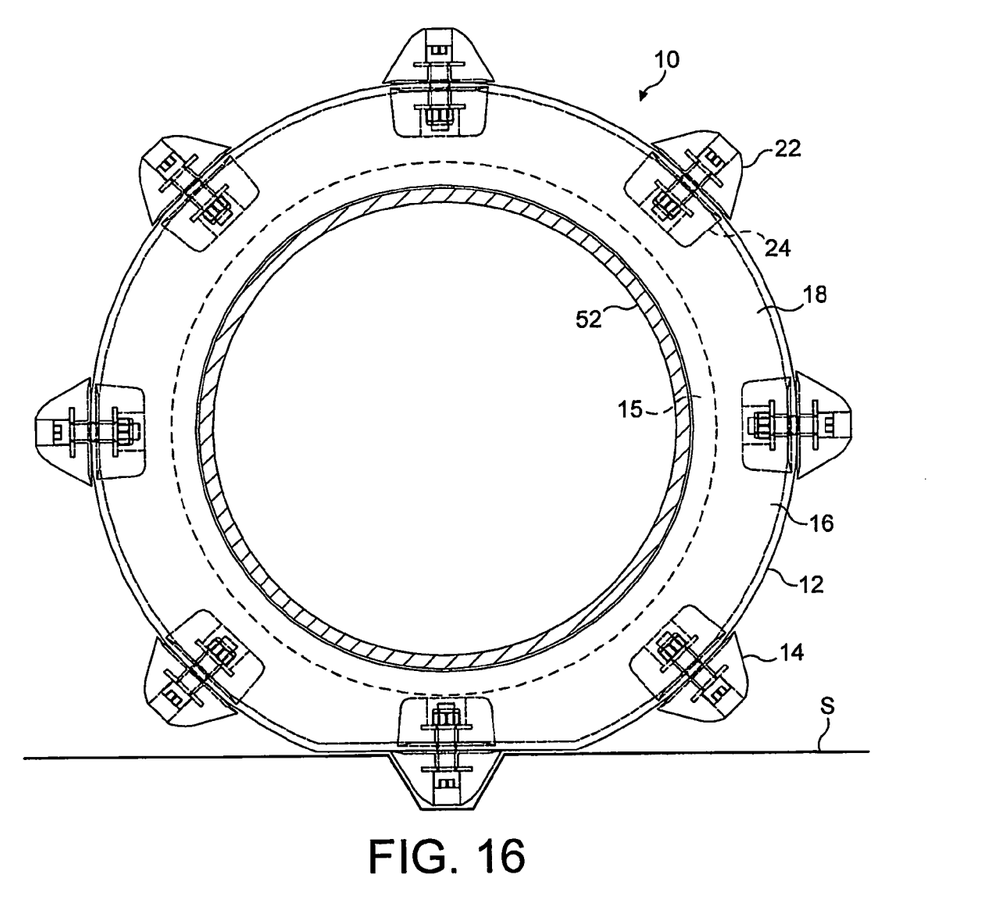
FIG. 16 is an axial section of the apparatus of FIG. 15, in use.

When the roller is used to treat the soil, for example when drawn behind a tractor on a frame, the soil treatment components 14 press into the soil to create a dimpled soil profile while the radial wall of the endless band 12 consolidates the surface of the soil S. The radial wall 16 is pliable relative to the soil and the soil treatment components. Consequently, the reaction of the soil against weight of the roller 52 causes the wall to flex and flatten, until the mounting part 24 of the soil treatment component abuts the outer face of the spacer bands 15, as shown in FIG. 16. As the roller continues to rotate, the soil treatment component 14 comes out of the soil and as the weight of the roller comes off the radial wall 16, it flexes back to its original part circular shape. That tends to force off any soil or other debris which may have stuck to the surface of the band 12 so as to provide the apparatus with a self-cleaning facility.

The radial depth R of the sealing band 15 and/or the depth of the mounting parts 24 may be selected depending upon soil type and conditions. In very sticky soil conditions, a greater flex may be required to self clean and so the band would have smaller radial depth and the mounting parts 24 may be shallower. In less sticky conditions, less flex may be needed.

Figure 17:
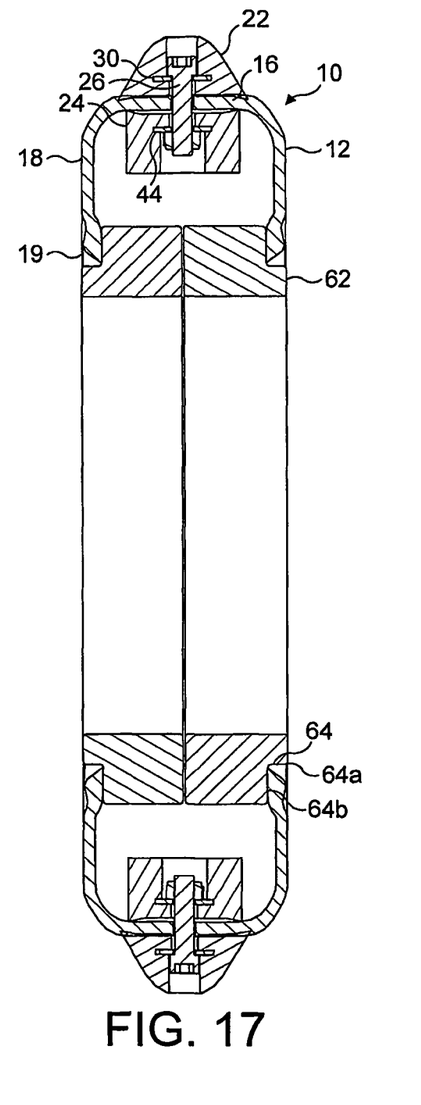
FIG. 17 is a radial section of an alternative soil treatment apparatus in accordance with the invention.

FIG. 17 illustrates an alternative soil treatment apparatus 10 which is similar in many respects to that shown in FIGS. 1 to 16. Parts corresponding to parts in FIGS. 1 to 16 carry the same reference numerals.

In FIG. 17, the soil treatment apparatus 10 is the same as that shown in FIGS. 1 to 16 with the exception of the spacer bands. The spacer bands 62 in FIG. 17 are L-shaped in section with an annular recess cutaway from one corner to form an annular shoulder 64. The annular shoulder 64 is defined by an axially extending shoulder part 64a and a radially extending shoulder part 64b.

The endless band 12 is mounted on a pair of spacer bands 62 arranged back to back with their annular shoulders 64 facing outwardly. The radially inner edge of the bead 19 abuts the axially extending shoulder part 64a and the axially inner edge of the bead 19 abuts the radially extending shoulder part 64b.

As can be seen in FIG. 17, the outermost faces of the spacer bands 62 project axially beyond the beads 19 and side walls 18 of the endless band 12. In that way, when the apparatus 10 of FIG. 17 is arranged on a roller 52, as shown in FIG. 15, the spacer bands 62 take up the axial compression applied by end plates 56.

If soil enters the space between apparatuses 10, the arrangement of the bead 19 against the shoulder 64 prevents soil ingress as increased soil pressure against the bead serves only to increase the seal between the bead and the shoulder.

The "stickiness" of each apparatus 10 relative to the cylindrical core 54 of the roller 52 can be varied by altering the level of axial compression of the end plates 56. If the compression increases, the bands 62 will tend to bow radially which increases the friction between the bands 62 and the core 54. Lowering that axial compression lowers the friction to allow the bands 12 to run loose.

Soil treatment apparatuses in accordance with the invention as described above have the advantage that the soil treatment components or teeth are readily replaceable and can be selected according to the relevant soil type or conditions in which the apparatus is expected to work. For example, in very stony ground then the tooth can be selected which is made from particularly tough material and yet that can be mounted on an endless band which will self clean. Moreover, because the teeth are individually replaceable, damage to one tooth does not require replacement of the entire apparatus. Likewise, damage to the endless band does not require replacement to all of the teeth as the teeth can be removed from the damaged band and reinstalled on a new band.

The invention claimed is:

1. A soil treatment apparatus comprising side-by-side endless bands for consolidating soil, each band comprising a pliable radial wall adapted to flex, flatten and flex back to force soil and/or debris off of the radial wall, and
a soil treatment component for forming a soil profile releasably attached to at least one of the endless bands so as to project radially therefrom, the soil treatment component being formed in two separate parts, a first part being arranged radially outbound of the endless band and a second part being arranged radially inbound of the endless band, the first part is configured to be wear resistant and the second part is configured to set the depth of flex of the endless band.

2. The soil treatment apparatus according to claim 1, in which the endless bands have a radial wall part and opposite side wall parts.

3. The soil treatment apparatus according to claim 1, in which each of the endless bands include an aperture defined radially therethrough and the soil treatment component extends through the aperture.

4. The soil treatment apparatus according to claim 1, in which the soil treatment component is relatively hard as compared to the endless bands which are relatively pliable with respect to the soil treatment component.

5. The soil treatment apparatus according to claim 1, in which the wall thickness of each endless band is less than the wall thickness of the soil treatment component.

6. The soil treatment apparatus according to claim 1, in which a plurality of radial apertures is formed through each band and a respective plurality of the soil treatment components is provided.

7. The soil treatment apparatus according to claim 1, in which the soil treatment component has a mounting part and a soil treatment part.

8. The soil treatment apparatus according to claim 1, in which the first part is for treating the soil and the second part is for securing the first part on the band.

9. The soil treatment apparatus according to claim 8, in which the-second part acts to limit flexure of the endless bands.

10. The soil treatment apparatus according to claim 8, in which a spacer band is provided arranged radially inwardly of the second part to assist in sealing against soil ingress and the second part acts to limit flexure of the endless band, the dimensions of the spacer band and/or the second part are preselected depending upon soil type and conditions.

11. The soil treatment apparatus according to claim 1, in which the apparatus is carried on a cylindrical core.

12. The soil treatment apparatus according to claim 11, in which the outer diameter of the core is smaller than an inner diameter of the apparatus.

13. The soil treatment apparatus according to claim 11, in which a spacer band is provided, in which the at least one endless band is mounted on the spacer band and the spacer band, in turn, is mounted on the cylindrical core.

14. The soil treatment apparatus according to claim 1, in which the soil treatment component of the apparatus is either pyramidal, frustopyramidal, conical or frustoconical.

15. The soil treatment apparatus according to claim 1, in which the soil treatment component is formed from rubber or other elastomeric material, comprising recycled rubber, or rubber from recycled vehicle tires.

16. A soil treatment apparatus comprising side-by-side endless bands for consolidating soil, each band comprising a pliable radial wall adapted to flex, flatten and flex back to force soil and/or debris off of the radial wall,
   a soil treatment component for forming a soil profile releasably attached to at least one of the endless bands so as to project radially therefrom, the soil treatment component comprising a first part and a second part, the first part being arranged radially outbound of the endless band and the second part being arranged radially inbound of the endless band, the first part is configured to be wear resistant and the second part is configured to set the depth of flex of the endless band, and
   a spacer band arranged radially inwardly of the second part to assist in sealing against soil ingress.

17. A soil treatment apparatus comprising
   at least two side-by-side endless bands of resilient material for consolidating soil, each endless band comprising a pliable radial wall adapted to flex, flatten and flex back to force soil and/or debris off of the radial wall,
   soil treatment components of a material harder than the resilient material for forming a soil profile releasably attached to the endless bands so as to project radially therefrom, the soil treatment component being formed in two separate parts, a first part being arranged radially outbound of the endless band and a second part being arranged radially inbound of the endless band, the first part is configured to be wear resistant and the second part is configured to set the depth of flex of the endless band, and
   wherein each of the side-by-side endless bands comprises a side wall having a bead adapted to be held in compression to form a seal with an adjacent abutting band whereby soil ingress between the endless bands is reduced.

* * * * *